US006488581B1

(12) United States Patent
Stockdale

(10) Patent No.: US 6,488,581 B1
(45) Date of Patent: Dec. 3, 2002

(54) MASS STORAGE DATA PROTECTION DEVICE FOR A GAMING MACHINE

(75) Inventor: Jim Stockdale, Graegle, CA (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/338,262

(22) Filed: Jun. 22, 1999

(51) Int. Cl.[7] .............................................. G06F 17/00
(52) U.S. Cl. ........................ 463/29; 463/43; 711/163; 711/112
(58) Field of Search .................... 463/43, 29; 380/3, 380/4, 5, 49; 360/60; 711/163, 112; 395/186

(56) References Cited

U.S. PATENT DOCUMENTS

| | | | | |
|---|---|---|---|---|
| 4,091,418 A | * | 5/1978 | Ciciora | 358/160 |
| 4,727,544 A | * | 2/1988 | Brunner et al. | 371/21 |
| 5,126,890 A | | 6/1992 | Wade et al. | |
| 5,513,337 A | * | 4/1996 | Gillespie | 395/479 |
| 5,564,036 A | * | 10/1996 | Sugai | 711/152 |
| 5,657,445 A | * | 8/1997 | Pearce | 395/186 |
| 5,668,973 A | * | 9/1997 | Stutz et al. | 711/152 |
| 6,101,586 A | * | 8/2000 | Ishimoto et al. | 711/163 |

OTHER PUBLICATIONS

"IDE" PCUGR Handbook—Glossary. [Retrieved on Oct. 11, 2000]. Retrieved from the Internet: <URL:http://pcu-gr.org/handbook/glossary.htm>. p. 11.*

Fujitsu IDE Hard Disk Drives, http://www.adfa.oz.au, printed from webpage on Feb. 18, 2000, 3 pages.

3.5" Ultra DMA Electronic Disk™ Flash Disk and Solid State Disk Storage Solution, http://www.bitmicro.com, printed from webpage on Feb. 18, 2000, 7 pages.

Berg et al., "Method and Apparatus for Inhibiting a Selected IDS Command," Patent Application No. 09/573,663, filed on May 18, 2000, 31 Pages of Specification and 19 Sheets of Drawings.

* cited by examiner

*Primary Examiner*—Michael O'Neill
*Assistant Examiner*—Julie Brocketti
(74) *Attorney, Agent, or Firm*—Beyer Weaver & Thomas, LLP

(57) ABSTRACT

A mass storage data protection system for use with a mass storage device in a gaming machine to protect the mass storage device from unauthorized commands. The mass storage data protection system includes a mass storage device command latch, a timing circuit for timing signals between the mass storage device command latch and the mass storage device, a comparator and a comparator command register in communication with the comparator. The comparator command register includes commands that generate a fault within the mass storage data protection system such that when the comparator receives a command from the mass storage device command latch corresponding to the command within the comparator command register, a fault is generated within the mass storage command latch.

12 Claims, 2 Drawing Sheets

MASS STORAGE DATA PROTECTION DEVICE FOR A GAMING MACHINE

BACKGROUND OF THE INVENTION

1. Field of the Invention

The present invention relates to a mass storage data protection system, and more particularly, to a mass storage data protection system for use with a mass storage device in a gaming machine to protect the mass storage device from unauthorized commands.

2. Description of the Prior Art

Regulations within the gaming industry have historically proscribed "writable" memory devices for the storage of computer codes that control the payoff aspects associated with a gaming machine. These code routines are so critical to operation that their corruption, either accidentally or deliberately, could result in cheating players. If such corruption occurred, even infrequently, it could pose a significant threat to the integrity of gaming operations. The storage of these codes is typically handled by a less volatile type of memory device, such as a ROM or EPROM.

As the gaming industry moves toward game designs that utilize more multimedia style game presentation, the need for increased memory storage for game codes, graphics, sound, video etc., grows dramatically. Quickly, the use of EPROM style devices for data storage is becoming a significant burden and hindrance to the development of the gaming machines with enhanced capabilities. The use of cost effective, higher density mass storage devices will thus become necessary.

In the personal computer industry, the need for large amounts of nonvolatile mass storage has not been nearly as significant. In fact, the opposite scenario is actually occurring. Current personal computer operating systems rely on the fact that data can be stored on the mass storage devices such as hard disks. This allows these operating systems to support virtual memory configurations, storage of recent web sites visited, storage of temporary recovery files in the event of a power interruption, etc.

In earlier generations of hard disk drives that utilize the intelligent drive electronics (IDE) style of system interface, it was not uncommon for these drives to be equipped with write protection jumpers to allow the disk to be write protected against data loss or modification. As the need for cost reduction in the computer industry increased, these jumpers were eliminated since the primary personal computer operating systems do not require them. Thus, in today's market, it is nearly impossible to find an IDE disk drive (the industry's most cost effective mass storage solution) that includes a write protection jumper.

SUMMARY OF THE INVENTION

In accordance with the present invention, a mass storage data protection system for use with a mass storage device in a gaming machine includes a mass storage device command latch, a timing circuit for timing signals between the mass storage device command latch and the mass storage device, a comparator between the mass storage device command latch and the timing circuit, and a comparator command register in communication with the comparator. The comparator command register includes commands that generate a fault within the mass storage data protection system. When the comparator receives a command from the mass storage device command latch corresponding to a command within the comparator command register, a fault is generated within the mass storage command latch.

In accordance with one aspect of the present invention, the mass storage data protection system further includes a control and status register in communication with the comparator command register and the comparator. The control and status register is configured to at least partially control functioning of the mass storage data protection system.

In accordance with another aspect of the present invention, the timing circuit includes a synchronizer and a reset generator.

In accordance with a further aspect of the present invention, the comparator command register includes a fixed command array and a user command array.

In accordance with yet another aspect of the present invention, the mass storage device consists of an IDE hard disk drive and the mass storage device command latch consists of an IDE command latch.

Accordingly, the present invention provides a mass storage data protection device for use in a gaming machine that allows for the use of "off the shelf" cost effective mass storage solutions.

Additionally, the present invention provides the ability to control access to data stored on the mass storage medium in order to prevent unauthorized or accidental modification but allow data modification under controlled system administrative conditions, thereby maintaining gaming machine security.

Furthermore, the present invention provides for the ability to detect an attempted data modification and stop execution of the gaming code in response thereto.

Additionally, the present invention provides for the ability to extend the capabilities of the circuit by the use of programmable registers. This allows for the use of mass storage devices that provide a "super set" of the functionality controlled by the basic circuit.

DETAILED DESCRIPTION OF THE PREFERRED EXEMPLARY EMBODIMENTS

Figure 1:
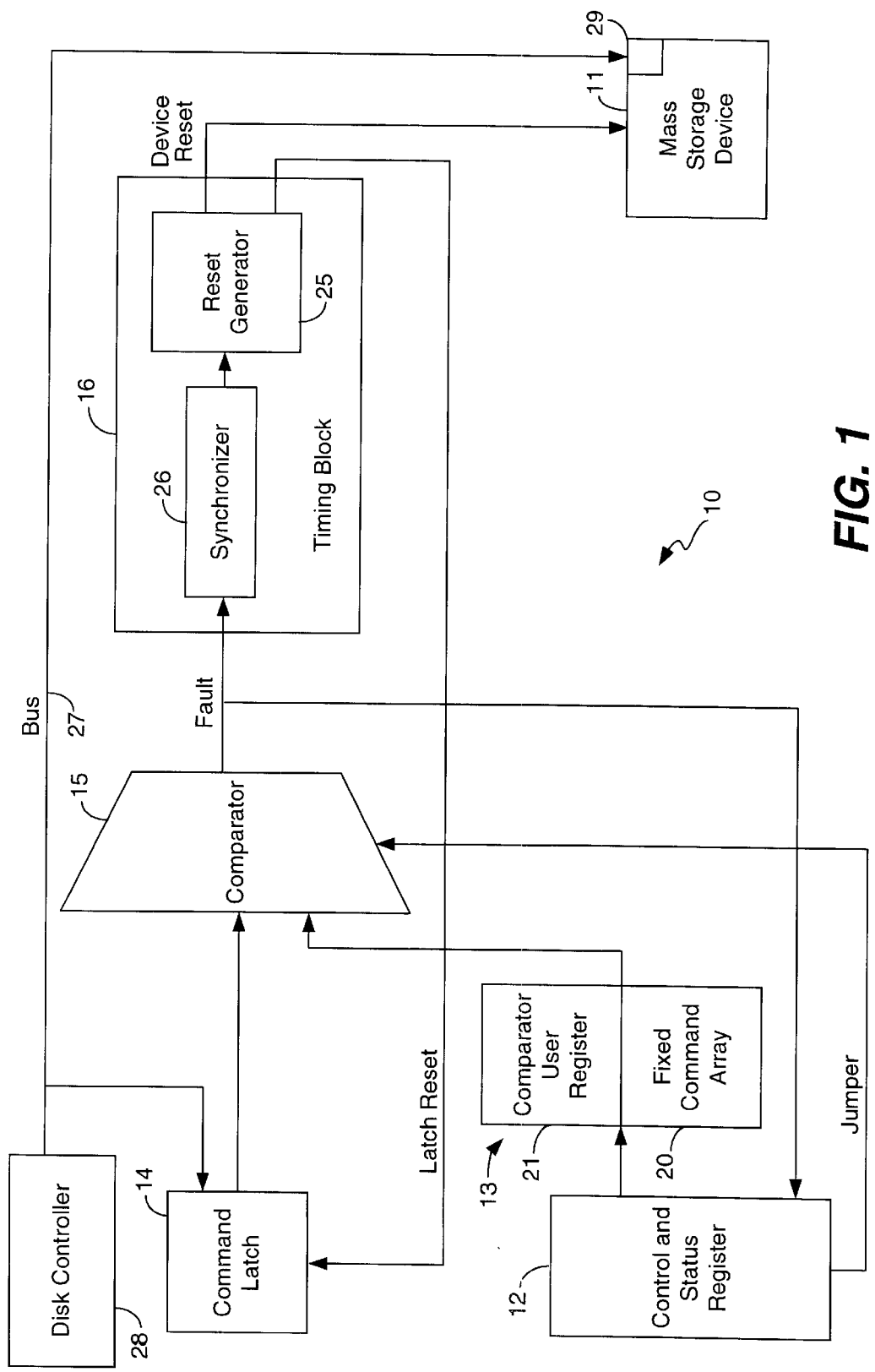
FIG. 1 is a schematic illustration of a mass storage data protection system in accordance with the present invention.

FIG. 1 schematically illustrates a mass storage data protection system 10 for use with a mass storage device 11 in a gaming machine. The system preferably consists of a control and status register 12, a comparator command register 13, a command latch 14, a command comparator 15, and a timing block 16. Since the primary protection of the mass storage device in a gaming machine is to prevent unauthorized writing to the mass storage device, the system will be described with reference to protecting the mass storage device from unauthorized write commands. However, those skilled in the art will understand that other commands, as desired, may also be included for protection of the mass storage device.

Additionally, system 10 is being described herein for providing protection for a single mass storage channel. System 10 would need to be replicated to protect additional channels.

In a preferred embodiment, mass storage data protection circuit 10 includes control and status register 12 that provides information regarding the function of the circuit. Preferably, the control and status register is an 8 bit register. Bits 0 and 1 preferably serve as the comparator user register address pointer.

Bit 5 preferably is used to determine when a write fault that is generated should be a non-maskable interrupt (NMI). If this bit is set high, then any faults generated by the data protection circuit will be an NMI. If faults are going to be used to create NMIs, then the system must deal with any write faults. Hence, this bit and NMIs are used to make the system an active one as opposed to a passive one.

Bit 6 preferably serves as the jumper. If bit 6 is high then the jumper is removed and the data protection system is activated, i.e., it is set to write protect. If the bit is low then the jumper is installed and the data protection system is not activated, i.e., data may be written to the mass storage device.

Finally, bit 7 preferably becomes high whenever a data write is attempted to the mass storage device and the jumper is removed. In order to clear the bit, a 1 must be purposefully written to the bit location.

The remaining bits may be unused or used as desired.

Comparator command register 13 includes a fixed command array 20 and preferably includes a comparator user register 21. Fixed command array 20 includes ANSI commands that are directed to write commands. The write commands are preferably set by the ATA (AT attachment) device interface specification, which currently is the general industry standard that defines command sets. Comparator user register 21 is a register through which additional commands to be excluded may be loaded into command comparator 15. In the preferred embodiment, up to four additional commands may be loaded into comparator user register 21 to cause a write fault if sent to the mass storage device. The individual user comparator registers may be read or written by setting the address in the control and status register and then reading or writing the comparator user register access port. Generally, if the system includes a comparator user register, upon start-up of the mass storage data protection system, the comparator user register will have to be initialized in order to determine the commands needed.

As noted above, comparator user register 21 is used to store additional command values that must not be executed. Thus, the purpose of the comparator user registers is to include vender specific commands that could cause data to be modified on the mass storage device. A preferred sequence of software execution includes the software querying the mass storage device to identify itself, compare the identification table of valid devices, and then load the user registers with those vender specific commands that will cause data modification. As noted previously, up to four additional vender specific commands may preferably be added to the comparator command register. Preferably, these registers are initialized to FF at reset.

Command latch 14 is connected to the bus 27 of the respective channel that is being protected in the mass storage device. Command latch 14 stores the data values written by the disk controller 28 to the mass storage device command register 29. Values that are written to the command latch are compared with values stored in the command comparator to determine if a write fault and device reset should be generated. Commands are stored in this latch only if the write enable jumper pin is high, i.e., the jumper is removed. If this pin is low, it signals that the write enable jumper is installed and that device writes are currently being allowed and thus it is not necessary to monitor commands.

In a preferred embodiment, mass storage device 11 is an IDE hard disk drive and command latch 14 is an IDE command latch.

Timing block 16 of the mass storage data protection system preferably includes a reset generator 25 and a synchronizer 26. Reset generator 25 is responsible for generating a reset signal to the channel on which a write fault has occurred. If the command comparator circuit detects a write operation is attempted, it signals the reset generator to send a reset pulse to the channel. Preferably, the reset generator uses a 14.318 MHz input clock that is available in the mass storage data protection system. Preferably, the input clock is divided by 512 to generate a 35.8 microsecond wide reset pulse. Currently, the minimum specification for the reset pulse to an IDE device is 25 microseconds. The reset generator also generates a reset to the IDE device by logically "ORing" the system reset with the reset generator reset. This allows the IDE device to be reset at power up or power down. Synchronizer 26 is provided for synchronizing between asynchronous and synchronous signals provided from comparator 15 and provided to reset generator 25. Those skilled in the art will understand that other arrangements or circuits may be used for timing block 16, such as for example logic circuits.

The command comparator, as noted above, compares the values written to the command latch with values stored in the comparator command register. If a successful comparison takes place, a signal is sent to the device reset generator to cause a device reset to occur. Additionally, the comparator sets the write fault bit 7 in the control and status register high.

Figure 2:
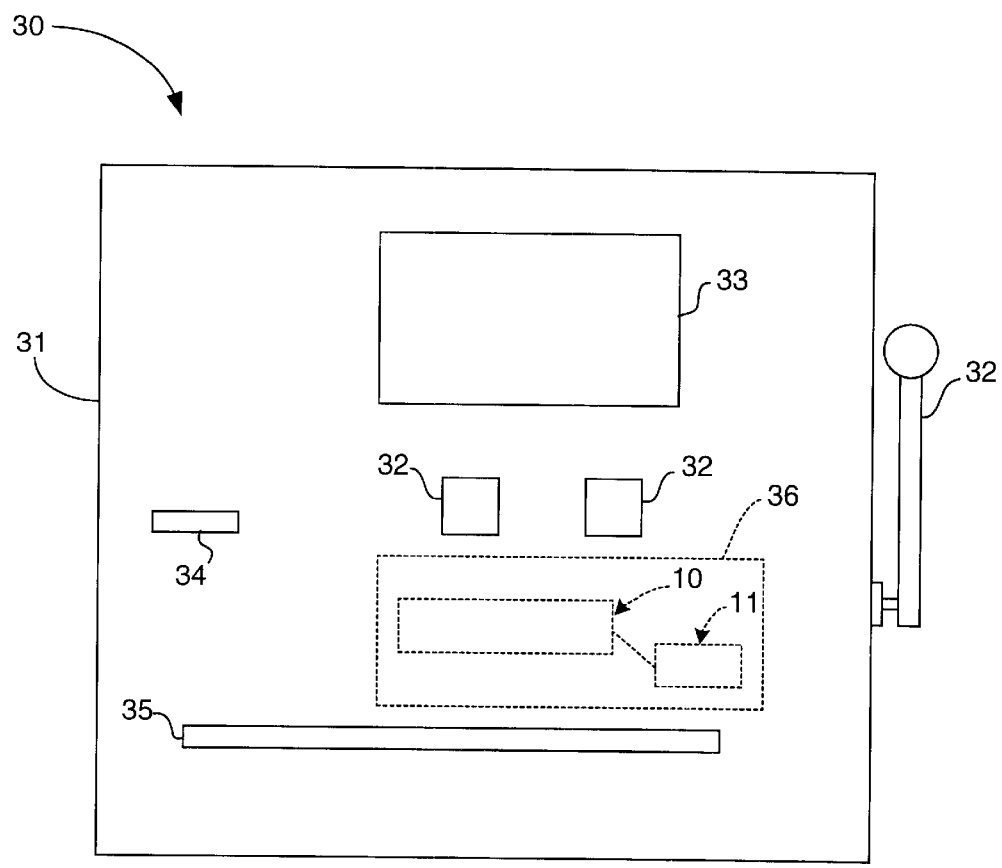
FIG. 2 is a schematic illustration of a gaming machine including a mass storage data protection system in accordance with the present invention.

FIG. 2 illustrates a gaming machine 30 that includes a housing 31, at least one user input 32 coupled to the housing, a display 33, such as, for example, a CRT, LCD or plasma display, coupled to the housing, a money input 34 and a money output 35. The gaming machine includes a control system 36 that includes a data mass storage device 11 and the mass storage data protection system 10 in accordance with the present invention.

Although the invention has been described with reference to specific exemplary embodiments, it will be appreciated that it is intended to cover all modifications and equivalents within the scope of the appended claims.

What is claimed is:

1. A mass storage data protection system for use with an IDE mass storage device connected to a disk controller via a bus in a gaming machine, the mass storage data protection system comprising:

a mass storage device command latch for storing commands from a disk controller;

a comparator command register including ATA write commands;

a comparator in communication with the mass storage device command latch and the comparator command register, wherein the comparator issues a fault when the mass storage command latch stores a command matching an ATA command from the comparator command register; and a reset generator in communication with the comparator, which reset generator issues a reset signal to the IDE mass storage device when it receives a fault from the comparator.

2. The mass storage data protection system of claim 1, further comprising a control and status register in communication with the comparator command register.

3. The mass storage data protection system of claim 2, wherein the control and status register comprises information specifying a non-maskable interrupt when the comparator issues the fault.

4. The mass storage data protection system of claim 2, wherein the control and status register comprises information specifying a jumper which indicates whether data protection is activated.

5. The mass storage data protection system of claim 1, further comprising a synchronizer for synchronizing signals provided from the comparator to the reset generator.

6. The mass storage data protection system of claim 1, wherein the comparator command register includes a user command array.

7. A gaming machine comprising:
   a housing;
   at least one user input coupled to the housing; and
   a disk controller;
   an IDE mass storage device for storing computer code for the gaming machine;
   a bus connecting the disk controller to the IDE mass storage device; and
   a mass storage data protection system comprising:
      a mass storage device command latch for storing commands from a disk controller;
      a comparator command register including ATA write commands;
      a comparator in communication with the mass storage command latch and the comparator command register, wherein the comparator issues a fault when the mass storage device command latch stores a command matching an ATA command from the comparator command register; and
      a reset generator in communication with the comparator, which reset generator issues a reset signal to the IDE mass storage device when it receives a fault from the comparator.

8. The gaming machine of claim 7, wherein the mass storage data protection system further comprises a control and status register in communication with the comparator command register.

9. The gaming machine of claim 8, wherein the control and status register comprises information specifying a non-maskable interrupt when the comparator issues the fault.

10. The gaming machine of claim 8, wherein the control and status register comprises information specifying a jumper which indicates whether data protection is activated.

11. The gaming machine of claim 7, wherein the mass storage data protection system further comprises further comprising a synchronizer for synchronizing signals provided from the comparator to the reset generator.

12. The gaming machine of claim 7, wherein the comparator command register includes a user command array.

* * * * *